United States Patent [19]

Twilley et al.

[11] Patent Number: 4,847,142

[45] Date of Patent: Jul. 11, 1989

[54] MOISTURE PERMEABLE FILM FOR LAMINATION TO A TEXTILE MATERIAL

[75] Inventors: Ian C. Twilley, Chester; Robert A. Lofquist, Richmond, both of Va.

[73] Assignee: Allied-Signal Inc., Morris Township, Morris County, N.J.

[21] Appl. No.: 274,065

[22] Filed: Nov. 21, 1988

Related U.S. Application Data

[62] Division of Ser. No. 945,118, Dec. 22, 1986, Pat. No. 4,808,675.

[51] Int. Cl.$^4$ .............................. B32B 5/18; B32B 5/26
[52] U.S. Cl. .................................. 428/252; 428/315.5; 428/315.9; 428/317.1
[58] Field of Search ................... 428/252, 315.5, 315.9, 428/317.1

[56] References Cited

U.S. PATENT DOCUMENTS

| | | | |
|---|---|---|---|
| 3,473,956 | 10/1969 | McIntyre | 525/430 |
| 3,632,666 | 1/1972 | Okayaki et al. | 525/425 |
| 3,639,502 | 2/1972 | Okayaki et al. | 525/432 |
| 3,953,566 | 4/1976 | Gore . | |
| 4,194,041 | 3/1980 | Gore et al. . | |
| 4,443,511 | 4/1984 | Worden et al. . | |
| 4,468,505 | 8/1984 | Bowen et al. | 525/432 |
| 4,493,870 | 1/1985 | Vrouenraets et al. . | |
| 4,808,675 | 2/1989 | Twilley et al. | 525/408 |

FOREIGN PATENT DOCUMENTS 1108811 4/1968 United Kingdom .

OTHER PUBLICATIONS

Loftquist et al., *Textile Research Journal*, 55 (6), 325–333, (1985).

*Primary Examiner*—James C. Cannon
*Attorney, Agent, or Firm*—Melanie L. Brown; Richard A. Anderson

[57] ABSTRACT

This invention is a water-resistant film for lamination to a textile material, and the flexible, laminated product produced therewith. The film has a permeability of at least 0.0008 metric perm-cm. at 20° C. and 65 percent relative humidity and of at least 0.0006 metric perm-cm. at 30° C. and 50 percent relative humidity. The film is formed from a block copolymer having a number average molecular weight of from about 15,000 to about 35,000. The block copolymer contains polymer segments prepared by the amination of a polyether formed by treating a polyethylene glycol with an alkylene oxide of three or more carbon atoms. The product is a laminant of a layer of the described film and a layer of a textile material, and is useful in the formation of water-resistant, moisture permeable articles such as garments, tarpaulins, tents, and the like.

10 Claims, No Drawings

MOISTURE PERMEABLE FILM FOR LAMINATION TO A TEXTILE MATERIAL

This application is a division of application Ser. No. 945,118, filed Dec. 22, 1986, now U.S. Pat. No. 4,808,675.

BACKGROUND OF THE INVENTION

1. Field of the Invention

This invention relates to a water-resistant, moisture permeable film and to a flexible, laminated product made with a layer or layers of the film and a textile material. The product is suitable for making water-resistant garments, tarpaulins, tents, and the like. More particularly, the present invention relates to a polyamide film with a permeability of at least 0.0008 metric perm-cm. when tested at 20° C. and 65 percent relative humidity and of at least 0.0006 metric perm-cm. when tested at 30° C. and 50 percent relative humidity. These films are suitable for lamination to a polyamide material to render the same water-resistant and moisture permeable.

THE PRIOR ART

Layered articles or products which are water-proof, moisture permeable, and flexible are well known in the art. See, e.g., U.S. Pat. Nos. 4,493,870 to Vrouenraets et al., 4,443,511 to Worden et al., and 4,194,041 to Gore et al., all of which are hereby incorporated by reference. These products, which may be used to make fabrics to protect humans from wet weather, are formed of a hydrophilic layer covered with a hydrophobic layer.

The hydrophilic layer may be a textile material layer as in U.S. Pat. No. 4,493,870 or films of polyurethane polymer/perfluorosulfonic acid product as in U.S. Pat. No. 4,194,041.

The preferred hydrophobic layer of U.S. Pat. No. 4,194,041 is made of expanded polytetrafluoroethylene (PTFE) film. See U.S. Pat. No. 3,953,566 to Gore et al., hereby incorporated by reference, for preparation of these films. The preferred hydrophobic layer of U.S. Pat. No. 4,493,870 is a film of a copolyether ester consisting of a plurality of recurrent intralinear long-chain ester units and short-chain ester units which are randomly joined head-to-tail through ester bonds.

The key to these products is that the materials used prevent leakage of water into the article when fabricated while permitting transmission of moisture to the outside of the article. While the hydrophobic films of the prior art do this, they are relatively expensive; this led to development of the hydrophilic film of the present invention. Under certain test conditions, this film is more moisture permeable (breathable) than the films suggested by U.S. Pat. No. 4,493,870, while retaining impermeability to liquid water.

The block copolymer from which the films of the present invention are made have been used to form hydrophilic nylon fibers, as disclosed in the article "Hydrophilic Nylon for Improved Apparel Comfort" by R. A. Lofquist et al., published in Textile Research Journal Volume 55, No. 6, pages 325-333 June of 1985, hereby incorporated by reference.

SUMMARY OF THE INVENTION

The present invention comprises a water-resistant film for lamination to a textile material, as well as the flexible, laminated product made therewith.

The film has a permeability of at least 0.0008 metric perm-cm. when tested at 20° C. and 65 percent relative humidity and of at least 0.0006 metric perm-cm. when tested at 30° C. and 50 percent relative humidity. The film is formed from a block copolyether amide having a number average molecular weight of from about 15,000 to about 35,000. The block copolyether amide contains polymer segments which are prepared by the amination of a polyether formed by treating a polyethylene glycol with an alkylene oxide having at least three carbon atoms, preferably propylene oxide.

The copolyether amide polymer segments have the following structure:

A. a polyether segment consisting predominantly of

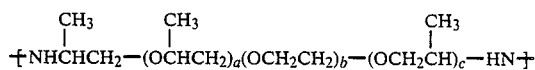

where c is at least 1, (a+c) is at least 1 but less than 5.5 and b is at least 10 but less than 90;

B. a polyamide segment consisting of at least one of the following

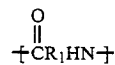  1.

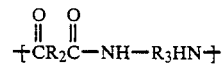  2.

where $R_1$, $R_2$ and $R_3$ are each selected from the same or different alkylene or substituted alkylene moieties of from 4 to 11 carbons and difunctional aromatic moieties, wherein the concentration of segment A in the copolyether amide is from about 5 to about 50%, preferably about 10 to about 25%, by weight of copolyether amide, and a phenolic antioxidant is used in the copolyether amide where the ratio of antioxidant to polyether segment is greater than 0.01 but less than 0.1 by weight. By "predominantly" is meant 90% or more.

In order to achieve higher weight fractions of segment A, it is necessary to either have high molecular weight (b above about 25) segment A or to use carboxylic acid terminator for segment B. It is preferred to add a carboxylic acid as a terminator for the segment B, more preferably a dicarboxylic acid.

The commercial preparation (see U.S. Pat. No. 3,654,370, hereby incorporated by reference) of the above polyether diamine segment A when (a+c) is less than 5.5 also produces a polyether monoamine segment in amounts of up to 10%, typically 5 to 10%, by weight of the total polyether segment. This polyether monoamine segment is hydroxy terminated and has the following structure,

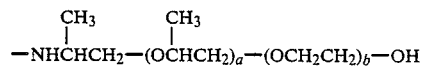

wherein a, (a+c), and b are all as defined above.

By a very expensive, noncommercial method, namely cyanoethylation of the above monoamine segment followed by hydrogenation, the hydroxyl group could be converted to an amine end group. That method and the resulting polyether segment are not preferred.

It is preferred that the total of a and c in segment A is from 3 to 4 and b is from 20 to 75, more preferably 40 to 50.

Preferably, the polyamide segment B has $R_1$ equal to $(CH_2)_5$.

The dicarboxylic acid is preferably selected from the group consisting of terephthalic, adipic, azelaic, isophthalic, dodecanedioic, sebacic and naphthalene dicarboxylic acid, most preferably the former.

The phenolic antioxidant is preferably selected from the group consisting of 4,4'-butylidene bis(6-tertiarybutyl-3-methylphenol), 4,4'-methylene bis-(6-t butyl-o-cresol), 1,3,5-trimethyl-2,4,6-tris[3,5-di-t-butyl-4-hydroxybenzyl]benzene, tetrakis[methylene(3,5-di-t-butyl-4-hydroxy-hydroxycinnamate)]methane, N,N'-hexamethylene bis(3,5-di-tert-butyl-4-hydroxy-hydrocinnamamide), 1,3,5-tris(3,5-di-t-butyl)-4-hydroxybenzyl)-s-triazine-2,4,6-(1H,3H,5H)-trione.

The preferred aminated polyethylene glycol is an amine-ended derivative of polyethylene glycol known as Jeffamine ED2001 (hereafter polyether diamine or PED), commercially available from Texaco Chemical Company. PED, a white waxy solid with a melting point of about 45° C., is made by reacting one mole of polyethylene glycol of about 2000 molecular weight with three to four moles of propylene oxide in order to convert a terminal hydroxyl to a secondary hydroxyl. This secondary hydroxyl is then converted to a primary amine by a proprietary process (U.S. Pat. No. 3,654,370). A material made by that or a similar process is suitable for creating the polymer segments of the preferred block copolyether amides.

Poly(oxyethylene)diamines can also be made by treating polyethylene glycol with acrylonitrile, and then hydrogenating the product. Such materials have been made in Japan, but the process is apparently more expensive, and this material is no longer readily available.

The length of the polyethylene glycol chain is known to affect the moisture regain of the glycol and of the polymer of which it is a part. The long-chain polyether diamine used to create the polyether segment is always a polyethylene oxide diamine having a molecular weight in the range of 600 to 3000. When use is made of a polyethylene oxide diamine having a molecular weight of less than 600, the proportion thereof to be incorporated in the copolyether amide is prohibitively high. For, a film made therefrom having a thickness of 35 μm and a MVTR of at least 1500 g/m²day has been found unsuitable for use in waterproof garments or tents because of its physical properties. Also the manufacture of garments from copolyether amide films prepared by using a polyethylene oxide diamine having a molecular weight greater than about 3000 are much more expensive to prepare and have a greater tendency to foam during the preparation of the copolyether amide. The most favorable results are obtained when the long-chain glycol is a polyethylene oxide glycol having a molecular weight in the range of 800 to 2200.

The manufacture of the present films from copolyether amides may be carried out in any manner known to the art. For example, the film blowing process may be used to produce films having a thickness in the range of 5 to 50 μm. The preferred films, however, are produced by flat die extrusion. The temperature of the quench roll preferably is chosen between 75° and 185° C., as described in U.S. Pat. No. 3,968,183, hereby incorporated by reference. Preferred thicknesses are discussed below under Test A for MVTR. Where strength is relatively unimportant the film may be nonoriented; permeability of the nonoriented films of the present invention is at least 0.0010 metric perm-cm. when tested at 20° C. and 65 percent relative humidity and at least 0.0008 when tested at 30° C. and 50 percent relative humidity.

The flexible, laminated product of the present invention comprises a first layer, which is the water-resistant film described above, and a second, textile material layer. These layers may be united, or laminated, in a variety of ways, for instance by heat treatment or through the use of an adhesive.

The adhesive to be used depends both on the composition of the copolyether amide and the type of textile material. It has been found that generally favorable results are obtained by using a fusible polyamide scrim as the adhesive for polyamide textile materials; similarly, a fusible polyester scrim would be expected to perform well with a polyester textile material.

Other constructions are contemplated, for example a three layer product wherein the copolyether amide film is flanked by layers of textile material.

In a particularly preferred construction, a fabric is made by laminating the described film to the hydrophilic layer of a hydrophilic-hydrophobic laminate. The hydrophobic material may be polyester, polypropylene or nylon 12, although polyester is preferred since it does not absorb oils, perspiration, etc. The hydrophilic layer adjacent the hydrophobic layer may be a weave of any comfort fiber, such as rayon, cotton, hydrophilic polyamide, with hydrophilic polyamide being preferred, especially a hydrophilic nylon 6. Construction of the hydrophilic-hydrophobic laminate will determine whether the layers remain discrete or whether they mix together, e.g., as in a double knit fabric where one side would remain predominantly hydrophilic and the other predominantly hydrophobic. Discussion of layers as if discrete is intended to cover this construction. The hydrophobic layer would form the interior of the article (for garments) with the hydrophilic film layer forming the exterior. With this product, moisture is pushed away from the wearer's skin through the hydrophobic layer and into the hydrophilic layer. Vapor molecules are then released into the atmosphere through the vapor-permeable (hydrophilic) film layer.

The textile material of choice is a hydrophilic nylon 6, preferably woven for strength and abrasion resistance; however, knitted or nonwoven polyamide materials may also be used. Other suitable fabrics include polyester, arcylics and polypropylene.

By hydrophilic is meant moisture and high water absorptive. By hydrophobic is meant relatively nonwater absorptive, or "water hating." See Fairchild's Dictionary of Textiles, 6th Edition, pages 300–01, 1979, and The Modern Textile Dictionary, pages 471–72, 1963, both of which are hereby incorporated by reference.

The following tests were used to determine properties of the copolyether amide films and/or products of the present invention.

A. Moisture Vapor Transmission Rate (MVTR): ASTM E96-80 (Water Method) at 30° C. and 50 percent RH. The MVTR of the copolyether amide film is, of course, not only dependent on the composition of the copolyether amide, but also on the film thickness. Film thickness preferably is chosen such that the MVTR is at least 1500 g/m²day to achieve a moisture permeable film. Favorable results are obtained using a film thickness in the range of 5 to 35 μm, but optimum results are obtained when the film thickness is in the range of 10 to 25 μm.

B. Water Resistance:

1. Sutter Test—Apparatus is modified as in U.S. Pat. No. 4,194,041, and visual determination of water resistance is made. The test procedure includes subjecting the copolyether amide film to a hydrostatic head of 25 cm of water over a period of 20 minutes.

2. Mullin's Burst Test (Federal Standard 191, Method 5512)—Visual determination of water resistance is made. See U.S. Pat. No. 4,194,041 for details.

A superatmospheric pressure level of about 213 kPa (2.1 atmospheres gauge pressure) is used as an acceptance level for the use envisaged.

C. Permeability: ASTM E96-80.

DESCRIPTION OF THE PREFERRED EMBODIMENT

The block copolymer is described in the Summary of the Invention wherein the segment A was added with the monomeric forms of segments B and C at the beginning of the polymerization cycle with the absence of any substantial foaming.

Polymers were made in the laboratory with various concentrations of PED. These concentrations are expressed as percents of the polyamide formed from PED and terephthalic acid, i.e., PED T. The percentages given involve three assumptions:

(1) That all the PED and all the terephthalic acid react.

(2) That the concentration of PED T in the polymer before extraction is equal to the concentration of PED T in the polymer after extraction.

(3) That equal moles of PED and terephthalic acid are present.

A number of batches were made with mono-functional terminators in addition to the PED and the terephthalic acid. The usual terminators used in the laboratory were benzoic acid and cyclohexylamine.

Examples of polymer batches, with their analyses are listed below in Table II. All batches were made with 23 ppm manganous chloride and 53 ppm hypophosphorous acid.

Increasing concentrations of PED T results in polymers with lower solution viscosity (FAV) at same total ends.

Block copolymers of nylon and PED T have a significantly lower melt viscosity than pure nylon with the same number of end groups (Table III). This is probably because of the high degree of flexibility of the polyether chain, and is consistent with the polyether component being soluble in the nylon. Melt viscosities are given only at a shear rate of 2000 sec$^{-1}$, and a temperature of 260° C. On the basis of these data, FAV correlates with melt viscosity better than number average molecular weight (total ends).

The PED polymer did not have a measurably lower melting point. Even with 20% by weight of PED T, the calculated reduction in melting point was only 0.9° C. The glass transition temperature is, however, decreased substantially by PED T. These data are shown in Table IV. The Differential Scanning Calorimeter analysis was performed on a duPont Model 1090 thermal analyzer. The solid polymer was heated in nitrogen at the rate of 10° C. per minute. The temperature at the peak of the endotherm was taken as the melting point, Tm. The temperature was raised to 255° C. and held for 5 minutes. It was then quenched in liquid nitrogen to produce an amorphous solid. The polymer was then heated at 10° C./minute. The temperature at which the heat flow increased, before becoming steady again, was taken as the glass transition temperature, Tg. The heating was continued at 10° C./minute. The temperature at the peak of the exotherm was taken as the temperature of crystallization on heating, Tch. The heating was continued to 255° C., and then cooled at 10° C./minute. The temperature at the peak of the exotherm was taken as the temperature of crystallization on cooling, Tcc.

A modification of Jeffamine ED2001, which had a higher content of primary amines, was desired to reduce the fraction of Jeffamine reacting like a monofunctional terminator. However, the chemical changes, namely more polypropylene oxide, required to produce a higher primary amine content resulted in what is believed to be a much higher extensional viscosity of the nylon. The polypropylene oxide content was increased to a value for a+c of 6.5 as defined in footnote 3. Lactam containing this additive foamed so severely that polymerization could not be controlled in the pilot plant.

For the Jeffamine ED2001, the analyses above showed that only about 95% of the ends were amines, with the remainder being hydroxyls (such as the structure given in the Summary of the Invention). There are two disadvantages to the presence of hydroxyl ends. They are less thermally stable than the amine ends, and they change the Jeffamine from being part of the polymer chain to being a monofunctional chain terminator. Therefore, the additive was modified to produce a Jeffamine with a higher primary amine content.

In order to understand the etiology of these hydroxyl ends it is necessary to understand the Jeffamine synthesis. The starting material is a polyethylene glycol. Propylene oxide is added which reacts with the hydroxyl ends of the polyethylene glycol. The function of the propylene oxide is to convert the primary hydroxyls of polyethylene glycol into the secondary hydroxyls. These secondary hydroxyls can be converted to amines by a process proprietary to Texaco. Any residual primary hydroxyl will not become a stable link in the nylon chain.

A sample of Jeffamine ED2001 was analyzed by NMR and it was found that almost all the non-amine ends were primary hydroxyls. Insufficient propylene oxide had been used to react with all hydroxyl ends.

Therefore, the polyethylene glycol substrate was treated with a higher than normal amount of propylene oxide. This precursor to Jeffamine was analyzed by NMR analysis and only secondary alcohols were found. The analysis also found a 40% increase in propylene oxide content, that is, an increase from 4.5 to 6.3 propylene oxide units. When this material was aminated the percent amine ends was raised from 95% to about 99%, according to NMR analysis.

This modified Jeffamine ED2001 was then used in a pilot plant nylon batch. However, it caused extensive and severe foaming problems in the reactor during polymerization, especially during the venting of steam used to initiat polymerization.

EXAMPLE 1

In a 3-liter stainless steel beaker, 1313.6 grams of caprolactam were mixed with 44.4 grams of epsilon-aminocaproic acid. To this was added 15.7 grams of terephthalic acid and 226.3 grams of a poly(oxyethylene)diamine derived from propylene oxide-capped polyethylene glycol. This polyether had a molecular weight of about 2000. It is available from Texaco Chemical Company, and called Jeffamine ED2001. There were also added, as light stabilizers, 0.0674 gram of $MnCl_2 \cdot 4H_2O$, and 0.1675 gram of a 50% solution of hypophosphorous acid, $H_3PO_2$ and 4.53 grams of Irganox 1010 (see footnote 10 to Table I), a phenolic antioxidant. This solution was homogeneous.

The solution was poured into a 3-liter glass reaction flask equipped with an anchor type agitator and a heating mantle. Over a one hour period it was heated to 255° C., under a nitrogen blanket. At the end of 3.4 hours at 255° C. a polymer strand was extruded from the bottom of the reactor, and pelletized. The pellets were subjected to five one-hour extractions with water at 95° C. to remove unreacted caprolactam, and then dried for 16 hours at 100° C., under vacuum.

The washed and dried polymer had a relative viscosity in formic acid (FAV) of 47 with 37 carboxyl equivalents and 37 amine equivalents per $10^6$ grams of polymer.

EXAMPLES 2–16

Using the same method as Example 1 above, polymers were made using the reactants and conditions given in Table I with the resulting polymer properties given in Table I. The light stabilizers in amounts of Example 1 were used. The melt viscosity listed in Table 3 was measured using a Monsanto Automatic Capillary Rheometer Model 3501. The procedure used was that described by the manufacturer. The relative formic acid viscosity (FAV) is determined by the method ASTM D-789-62T. (See U.S. Pat. No. 3,890,286.)

EXAMPLE 17

In a 3-liter stainless steel beaker, 1314 grams of caprolactam is heated to 90° C. When the lactam is completely melted, 44.5 grams of epsilon-aminocaproic acid, 226 grams of Jeffamine ED2001, and 17.8 grams of azelaic acid are added, with stirring. Then 0.0674 gram of manganous chloride tetrahydrate, 0.1675 gram of a 50% solution of hypophosphorous acid, and 6.79 grams of Irganox 1010, are added and the mixture is poured into a 3-liter glass resin flask equipped with a motor driven anchor agitator, a nitrogen sweep, an electrically heated mantle and a bottom outlet.

The mixture is then heated from 90° C. to 255° C. over a one hour period with stirring and with a nitrogen sweep across the surface of the melt.

After four hours at 255° C. the nylon polymer is extruded from the bottom of the reactor in the form of an 0.1 inch (0.25 cm) diameter strand. The strand is pelletized, and the resulting pellets are extracted with water to remove unreacted caprolactam. The extracted pellets are dried for 16 hours under vacuum. The resulting polymer would have a 36 FAV, with 46 carboxyl and 56 amine gram-equivalents per $10^6$ grams of polymer.

EXAMPLE 18

In a 3-liter stainless steel beaker, 1382 grams of caprolactam are heated to 90° C. When the lactam is completely melted, then, with stirring, 57 grams of epsilon-aminocaproic acid, 150 grams of Jeffamine ED2001, 8.6 grams of lauric acid, 0.0674 grams of manganous chloride tetrahydrate, 0.1675 gram of a 50% solution of hypophosphorous acid and 4.5 grams of Irganox 1010 are added. The mixture is polymerized and the polymer is processed as in the preceding example.

The resulting polymer would have an FAV of 30, with 15 carboxyl and 70 amine equivalents per $10^6$ grams of polymer.

EXAMPLE 19

In a 3-liter stainless steel beaker, 1380 grams of caprolactam are heated to 90° C. After the caprolactam is melted, 140 grams of Jeffamine ED2001 are added with stirring. Also added are 0.0674 gram of manganous chloride tetrahydrate, 0.1675 gram of a 50% solution of hypophosphorous acid and 4.2 grams of Irganox 1010. The mixture is subjected to polymerization conditions for four hours, and then the polymer is processed as in the preceding example.

The resulting polymer would have an FAV of 40 with 103 amine ends and 20 carboxyl equivalents per $10^6$ grams of polymer.

EXAMPLE 20

The preferred antioxidant used in the polymer for the film (which contains up to 25 percent by weight of Jeffamine ED2001) is Irganox 1010, made by Ciba-Geigy.

Its structure is:

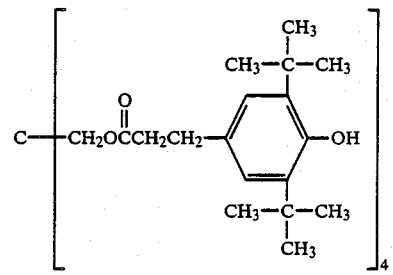

It can be referred to as a tetrafunctional hindered phenolic antioxidant containing four ester groups per molecule. These ester groups can interchange, or react, with the amine groups in nylon:

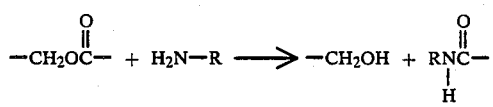

The interchange is evidenced by an increase in carboxyl groups compared to amine groups in polymerizations.

To achieve 40 equivalents of ester links, 10 moles of Irganox 1010 were added per $10^6$ grams of caprolactam and polymerized as in Example 1 to form nylon 6 polymer and the resulting polymer was analyzed as unwashed polymer for carboxyl groups and amine groups. The results are as follows:

|  | Carboxyls | Amines | Difference |
|---|---|---|---|
| Control, no additive | 47 | 41 | 6 |
| Nylon, with 10 moles Irganox per $10^6$ grams polymer | 57 | 26 | 31 |
| Nylon with 40 moles benzoic acid per $10^6$ grams polymer | 57 | 16 | 41 |

The data show that the ester-amine interchange occurs, and indicates that the Irganox 1010 is one of the terminal groups in the hydrophilic nylon molecule.

Many other antioxidants which do not contain ester groups could be used in place of Irganox 1010. This terminal group is not essential to the hydrophilic nylon performance. The preferred antioxidant where higher concentrations of antioxidant are needed is Ethanox 330, manufactured by Ethyl Corporation.

EXAMPLE 21

In a 100-gallon pilot plant reactor, 330 lb of caprolactam at 90° C. was mixed with 49.5 lb of Jeffamine ED2001, which had 3.5 propylene oxide units per mole. To this was added 1.5 lb of Irganox 1010, 3.2 lb of terephthalic acid, 6.3 g of $MnCl_2.4H_2O$, 18.4 g of 50% hypophosphorous acid, 13 lb of water and 15 g of Dow Corning's DC-36 antifoam. The mixture was heated to 255° C., and an autogenous pressure of 80 psig was generated. This pressure was vented over a period of three hours. The rate of venting was not limited by foaming. A vacuum of 10 mm Hg absolute was then attained without severe foaming, within 15 minutes.

When a polymer was made using the same ingredients, but with a Jeffamine ED2001 having 4.0 propylene oxide units per mole, the venting extended to 4.25 hr because of foam buildup.

EXAMPLE 22

Films were made from a conventional nylon 6 and a nylon 6 made similar to the procedure of Example 21 (15% PED). The polymer properties are shown in Table V. The equipment used for preparation of the films was a two-inch extruder. Maximum throughput was in the range of 60 lb/hr. The extruder supplied polymer to a die which cast the film. The film was passed around a quench roll and a series of other, idler rolls to be taken up on a spool. See Table VI for a description of these films.

Four of the films (B, D, E and F of Table VI) were oriented unidirectionally (machine direction) by passage over heated rolls rotating at different speeds. Details are provided in Table VII wherein the films are identified as 20, 40, 50 and 60, respectively. The stretch (orientation) ratio was the ratio of the speed of a relaxation roll to the speed of a preheat roll. In all cases the draw temperature was 99° C. (210° F.), with a 110° C. (230° F.) heat set roll.

Water entry pressure and MVTR data are given in Table VII.

EXAMPLE 23

Fifty pounds each of conventional nylon polymer, nylon polymer containing 15% PED, and nylon polymer containing 10% PED were used to prepare films as in Example 21. The polymer properties are detailed in Table IX. Cast film thickness was controlled by changing the roll speeds. The film was uniaxially oriented in the machine direction. With reference to Table X, it can be seen that the lower quench temperatures tended to produce amorphous films. The higher quench temperatures tended to produce crystalline films, due to the slower cooling rates.

EXAMPLE 24

Film E of Example 23 was laminated to a fabric made from hydrophilic nylon containing 15% PED by means of fusible polyamide scrim fabrics (SH240 and SH2410, respectively) obtained from Sharnet Corporation of Ward Hill, Mass.

The film was laminated to the fabric as follows. The film was placed on the lower platen of a press which had been heated to 150° C. One of the Sharnet polyamide scrims was then placed on top of the film, and the fabric was put on top of the scrim. The platens were closed at a pressure of 5000 psi and held for a period of 20 to 60 seconds. The adhesion between film and fabric was excellent in all cases. This was repeated for the second polyamide scrim with excellent results also. When a polyester scrim (Sharnet SH4400) was used instead of the polyamide, the adhesion was poor.

EXAMPLE 25

Films made from conventional nylon and from hydrophilic nylon were tested for water vapor permeability according to the test procedure outlined in ASTM E96 (Water Method).

The raw data and the normalized data, when the test was run at 20° C. and with 65 percent relative humidity in the controlled chamber, are given in Table X. These conditions were used because they are standard for the testing of textiles.

The test was also run by the same procedure, but with the chamber at 30° C. and 50 percent relative humidity. The raw data and the normalized data of this test are given in Table XI.

The two tests do not rank the films equally because of the different effects of humidity and temperature from the two tests. This dependency of test results on test conditions is pointed out in paragraph 4.1 of ASTM E96, where it is stated that a "permeance value obtained under one set of test conditions may not indicate the value under a different set of conditions".

The greater the permeability, the greater the amount of water vapor which can pass through the film under the identical driving force, i.e. water vapor partial pressure, when the film is of identical thickness.

When a high permeability is desired of a film, then the film should be thinner. However, limits exist because of difficulties in film manufacturing and because a certain mechanical film strength is required to avoid tears and perforations. Nylon films are well known to have high tensile strength and toughness. The tensile strength and toughness of the hydrophilic nylon described here is only slightly lower than conventional nylon because of the presence of polyether segments in the hydrophilic nylon. Abrasion resistance of the nylon film is also good.

EXAMPLE 26

A warp knit fabric was constructed having one face predominantly of a polyethylene terephthalate 40 denier/30 filament yarn, and the other face predominantly of a hydrophilic nylon (about 15 percent polyethylene glycol diamine) 84 denier/60 filament yarn, known as a push-pull fabric.

The hydrophilic nylon face of this fabric is bonded to a hydrophilic nylon film (made in accordance with Example 22 and similar to Film H, above) of 0.5 mil thickness by means of a fusible nylon scrim fabric (Example 23 above), by bringing the fabric, scrim and film together under pressure, and heating the assembly until the scrim melts to form a bond between the fabric and film, as is well known in the art, e.g. under pressure of about 2000 psig and a temperature of about 150° C.

The resulting laminate is useful for the preparation of tenting and outdoor sportswear where the buildup of humidity within the material makes the environment uncomfortable. The high strength and abrasion resistance of the hydrophilic nylon film is especially useful in this application.

TABLE I

| Polymer No. | Grams Lactam | Grams ACA[1] | Grams TPA[2] | Grams PED[3] |
|---|---|---|---|---|
| 1 | 1313.6 | 44.1 | 15.7 | 226.3 |
| 2 | 1313.6 | 44.1 | 15.7 | 226.3 |
| 3 | 1313.6 | 44.1 | 15.7 | 226.3 |
| 4 | 1313.6 | 44.1 | 15.7 | 226.3 |
| 5 | 1313.6 | 44.1 | 15.7 | 226.3 |
| 6 | 1313.6 | 44.1 | 15.7 | 226.3 |
| 7 | 1313.6 | 44.1 | 15.7 | 226.3 |
| 8 | 1245 | 32.5 | 20.9 | 302 |
| 9 | 1382 | 56.3 | 10.4 | 151 |
| 10 | 1314 | 44 | 15.7 | 226 |
| 11 | 1245 | 32.5 | 20.9 | 302 |
| 12 | 1245 | 32.5 | 20.9 | 302 |
| 13 | 1314 | 44 | 15.7 | 226 |
| 14 | 1314 | 44 | 15.7 | 226 |
| 15 | 1314 | 44 | 15.7 | 226 |
| 16 | 1314 | 44 | 15.7 | 226 |

| Polymer No. | Terminator, Grams | Antioxidant[10], Grams |
|---|---|---|
| 1 | 6.11 benzoic acid | 6.79 Irganox 1010 |
| 2 | 6.11 benzoic acid | 3.40 Irganox 1010 |
| 3 | 6.11 benzoic acid | 6.79 Goodrite 3125 |
| 4 | 0 | 6.79 Santowhite Powder |
| 5 | 0 | 6.79 Irganox 1010 |
| 6 | 0 | 4.53 Irganox 1010 |
| 7 | 0 | 6.79 Santowhite Powder |
| 8 | 0 | 15.1 Santowhite Powder |
| 9 | 6.0 cyclohexylamine | 6.79 Santowhite Powder |
| 10 | 5.0 cyclohexylamine | 6.79 Santowhite Powder |
| 11 | 6.11 benzoic acid | 15.1 Santowhite Powder |
| 12 | 4.96 cyclohexylamine | 15.1 Santowhite Powder |
| 13 | 0 | 0 |
| 14 | | 6.79 Ethanox 330 |
| 15 | | 13.6 Ethanox 330 |
| 16 | | 13.6 Irganox 1098 |

| Polymer Number | FAV[4] | COOH[5] | NH$_2$[6] | Hours[7] |
|---|---|---|---|---|
| 1 | 21 | 80 | 23 | 4½ |
| 2 | 23 | 67 | 16 | 4 |
| 3 | 36 | 44 | 13 | 8¾ |
| 4 | 47 | 33 | 38 | 4 |
| 5 | 39 | 41 | 25 | 4 |
| 6 | 36 | 38 | 39 | 5½ |
| 7 | 58 | 21 | 25 | 3½ |
| 8 | 30 | 34 | 50 | 4 |
| 9 | 32 | 37 | 35 | 4 |

| Polymer No. | Grams Lactam | Grams ACA[1] | Grams TPA[2] | Grams PED[3] |
|---|---|---|---|---|
| 10 | 30 | 21 | 55 | 4½ |
| 11 | 27 | 35 | 22 | 5 |
| 12 | 25 | 15 | 54 | 5 |
| 13 | 28 | 50 | 51 | 4½ |
| 14 | 30 | 54 | 63 | 4½ |
| 15 | 34 | 49 | 53 | 4½ |
| 16 | 31 | 44 | 49 | 6 |

Explanation of footnotes in Table I follows tables.

TABLE II

POLYMERIZATION WITH PED T

| Percent PED T | FAV[4] | COOH[5] | NH$_2$[6] | Hours[7] |
|---|---|---|---|---|
| 0 | 82.5 | 46 | 41 | 3.7 |
| 0 | 59.9 | 50 | 43 | 2.7 |
| 0 | 70.8 | — | — | 4.0 |
| 2 | 44.8 | 52 | 56 | 3.6 |
| 2 | 46.7 | 47 | 56 | 3.0 |
| 5 | 50.8 | 49 | 52 | 4.3 |
| 5 | 42.4 | 57 | 54 | 3.5 |
| 5 | 53.7 | 45 | 44 | 3.0 |
| 10 | 49.1 | 54 | 36 | 3.5 |
| 10 | 29.2 | 61 | 65 | 1.0 |
| 10 | 30.6 | 58 | 64 | 2.0 |
| 15 | 30.1 | 54 | 56 | 4.0 |
| 15 | 32.1 | 50 | 50 | 4.0 |
| 15 | 32.1 | 52 | 54 | 4.3 |
| 20 | 28.8 | 47 | 51 | 4.5 |
| 20 | 30.1 | 45 | 46 | 5.0 |
| 20 | 31.3 | 46 | 45 | 5.5 |
| 22 | 36.2 | 55 | 18 | 3.0 |

Batch Composition

| Percent PED T | Grams Lactam | Grams ACA[1] | Grams PED[3] | Grams TPA[2] |
|---|---|---|---|---|
| 0 | 1520.0 | 80.0 | 0 | 0 |
| 2 | 1491.5 | 75.3 | 30.1 | 2.1 |
| 5 | 1451.3 | 68.1 | 75.4 | 5.2 |
| 10 | 1382.5 | 56.3 | 150.8 | 10.4 |
| 15 | 1313.6 | 44.4 | 226.3 | 15.7 |
| 20 | 1244.7 | 32.5 | 301.8 | 20.9 |
| 22 | 1217.2 | 27.8 | 332.0 | 23.0 |

Explanation of footnotes in Table II follows tables.

TABLE III

MELT VISCOSITIES OF NYLON, POLYMERS AT 2000 SEC$^{-1}$, 260° C.

| Additives | Terminator | FAV[4] | COOH[5]/NH$_2$[6] | Melt Viscosity, Pa · s (cp × 10$^3$) |
|---|---|---|---|---|
| none | benzoic | 38 | 68/31 | 76 |
| none | — | 53 | 53/50 | 120 |
| none | acetic | 61 | 50/19 | 130 |
| none | acetic | 82 | 46/41 | 210 |
| 15% PED T | cyclohexyl-amine | 26 | 24/66 | 61 |
| 15% PED T | — | 30 | 53/55 | 65 |
| 15% PED T | benzoic | 36 | 42/17 | 112 |
| 15% PED T | acetic | 38 | 44/30 | 85 |
| 15% PED T | acetic | 43 | 30/30 | 100 |
| 20% PED T | — | 41 | 35/36 | 125 |

Explanation of footnotes in Table III follows tables.

TABLE IV

DIFFERENTIAL SCANNING CALORIMETER ANALYSIS OF NYLON CONTAINING PED T

| Concentration of PED T, % | Temperature, °C. | | | |
|---|---|---|---|---|
| | Tm | Tg | Tch | Tcc |
| 0 | 218.0 | 35.0 | 64.5 | 179.5 |
| 10 | 218.0 | 4.5 | 56.5 | 176.0 |
| 10 | 218.0 | 4.0 | 56.0 | 178.0 |
| 14 | 218.0 | 2.0 | 53.5 | 177.0 |
| 14 | 217.0 | 5.5 | 53.5 | 177.5 |
| 18 | 217.0 | 0 | 50.5 | 177.0 |
| 18 | 216.5 | 2.5 | 51.5 | 175.0 |
| 22 | 217.0 | −2.0 | 48.0 | 175.0 |

Tm obtained at 10° C./minute
Tg, Tch obtained at 10° C./minute
Tcc obtained at 10° C./minute

TABLE V

| | Nylon 6 | Nylon 6 With 15% PED |
|---|---|---|
| Wt. % caprolactam | 100 | 85 |
| Wt. % Jeffamine ED 2001 | — | 14 |
| Wt. % terephthalic acid | — | 1 |
| FAV | 55 | 42 |
| COOH meq/kg. | 50 | 48 |
| NH$_2$ | 50 | 34 |
| Tm, °C. | 218 | 217 |
| Tg, °C. | 36 | 3 |
| Tch, °C. | 64 | 53 |
| Tcc, °C. | 180 | 177 |
| Melt viscosity at 260° C. | 120,000 | 93,000 |

TABLE V-continued

|  | Nylon 6 | Nylon 6 With 15% PED |
|---|---|---|
| 2000 sec$^{-1}$, centipoise |  |  |

TABLE VI

| Film Identification | Polymer | Films Prepared Film Thickness | Notes |
|---|---|---|---|
| A | conventional | 1 mil | Amorphous 135° F. quench roll. |
| B | conventional | 3 mil | Amorphous 140° F. quench roll. |
| C | conventional | 9 mil | Too thick, film sags from extruder, uneven thickness. Diagonal folds in take-up. |
| D | conventional | 6 mil | Slightly cloudy, crystalline on one side, 90° F. quench roll. Fewer gels. |
| E | 15% PED | 6 mil | 90° F. quench roll. Extrusion rate 1 lb/min at 47.5 screw RPM, 1200 psig extrusion pressure. |
| F | " | 3 mil | 90° F. quench roll. |
| G | " | 1 mil | 80° F. quench roll. |
| H | " | 1 mil | 150° F. quench roll. Translucent film, "crystalline". |

TABLE VII

| Oriented Film | Oriented Thickness | Stretch Ratio |
|---|---|---|
| 20 | 1 mil | 2.96 |
| 40 | 2 mil | 2.76 |
| 50 | 2 mil | 2.76 |
| 60 | 1 mil | 2.76 |

TABLE VIII

| Film | Description | Water Entry Pressure, psi | MVTR[12] |
|---|---|---|---|
| A | conventional nylon, amorphous, nonoriented | 39.2 | 440 |
| G | 15% PED, amorphous, nonoriented | 34.8 | 2800 |
| H | 15% PED, crystalline, nonoriented | 40.2 | 4500 |
| 60 | 15% PED, amorphous, oriented | 19.2 | 1900 |

TABLE IX

|  | Conventional Nylon | 15% PED | 10% PED |
|---|---|---|---|
| FAV | 55 | 42 | 37 |
| COOH | 50 | 48 | 49 |
| NH$_2$ | 50 | 34 | 50 |
| Tm, °C. | 218 | 217 | 218 |
| Tg, °C. | 36 | 3 | 5 |
| Tch, °C. | 64 | 53 | 56 |
| Tcc, °C. | 180 | 177 | 178 |
| Melt viscosity, cp. at 260° C. 2000 sec.$^{-1}$ | 120,000 | 93,000 | 80,000 |

TABLE X

| Sample | Polymer Film | Quench Roll | Thickness, mils | Oriented[11] | Permeability MVTR[12] | Metric Perm-cm. |
|---|---|---|---|---|---|---|
| 1 | Conventional nylon | 100° F. | 1 | No | 210 | 0.0006 |
| 2 | 15% PED nylon | 100° F. | 1 | No | 440 | 0.0013 |
| 3 | 15% PED nylon | 175° F. | 1 | No | 500 | 0.0015 |
| 4 | 15% PED nylon | 100° F. | 1 | 3:1 | 290 | 0.0009 |
| 5 | 15% PED nylon | 175° F. | 1 | 3:1 | 280 | 0.0008 |
| 6 | SympaTex ™ film[13] | — | 0.5 | — | 630 | 0.0009 |
| 7 | Expanded PTFE membrane[14] | — | 0.5 | — | 900 | 0.0014 |

TABLE XI

| Sample | Polymer Film | Quench Roll | Thickness, mils | Oriented[11] | Permeability MVTR | Metric Perm-cm. |
|---|---|---|---|---|---|---|
| 1 | Conventional nylon | 100° F. | 1.2 | No | 205 | 0.0004 |
| 2 | 15% PED nylon | 100° F. | 1.0 | No | 500 | 0.0008 |
| 3 | 15% PED nylon | 175° F. | 1.2 | No | 530 | 0.0010 |
| 4 | 15% PED nylon | 100° F. | 1.0 | 3:1 | 390 | 0.0006 |
| 5 | 15% PED nylon | 175° F. | 1.0 | 3:1 | 420 | 0.0007 |
| 6 | SympaTex ™ film[13] | — | 0.5 | — | 980 | 0.0008 |
| 8 | 15% PED nylon | 85° F. | 1.2 | No | 610 | 0.0012 |

[1]Epsilon-aminocaproic acid.
[2]Terephthalic acid.
[3]Jeffamine ED 2001, a poly(oxyethylene)diamine having the predominant formula

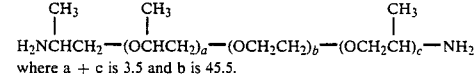

$H_2NCHCH_2-(OCHCH_2)_a-(OCH_2CH_2)_b-(OCH_2CH)_c-NH_2$ where a + c is 3.5 and b is 45.5.
[4]Formic acid viscosity measured by ASTM D-789-62T.
[5]Carboxyl groups per 10$^6$ grams polymer.
[6]Amine groups per 10$^6$ polymer.
[7]Hours at polymerization temperature of Example 1.
[8]Ultimate elongation, % on drawn yarn.
[9]Ultimate tensile strength, grams per denier on drawn yarn.
[10]Santowhite Powder is 4,4'-butylidene bis-(6-tertiarybutyl-3-methyl phenol) Ethanox 702 is 4,4'-methylenebis-(6-tertiary butyl-o-cresol) Ethanox 330 is 1,3,5-trimethyl-2,4,6-tris[3,5-di-tertiary butyl-4-hydroxybenzyl]benzene Irganox 1010 is tetrakis[methylene(3,5-di-tertiary butyl-4-hydroxy-hydrocinnamate)]methane Irganox 1098 is N,N'—hexamethylenebis(3,5-di-tertiary butyl)-4-hydrocinnamide) Goodrite 3114 is 1,3,5-tris(3,5-ditertiary butyl-4-hydroxy benzyl)-s-triazine-2,4,6-(1H, 3H, 5H)-trione Goodrite 3125 is a trifunction phenolic antioxidant, available from Goodyear, having a molecular weight of 1042.
[11]Stretching, machine direction only.
[12]MVTR, g/m$^2$/day, conditions changed to 65% RH, 20° C.
[13]Available from Enka America Inc.
[14]W. L. Gore & Associates, Inc., #S10831.

We claim:

1. A flexible, laminated product comprising:
   A. a water-resistant film layer having a permeability of at least 0.0008 metric perm-cm. when tested at 20° C. and 65 percent relative humidity and of at least 0.0006 metric perm-cm. when tested at 30° C. and 50 percent relative humidity, said film layer being formed from a block copolyether amide having a number average molecular weight of from about 15,000 to about 35,000 and containing polymer segments, said segments being prepared by the amination of a polyether formed by treating a polyethylene glycol with an alkylene oxide having at least three carbon atoms; and
   B. a textile material layer.

2. The product of claim 1 wherein said textile material comprises a polyamide.

3. The product of claim 2 wherein said polyamide is selected from the group consisting of nylon 6 and nylon 6,6.

4. The product of claim 3 wherein said polyamide is hydrophilic.

5. The product of claim 4 wherein said polyamide is nylon 6.

6. The product of claim 5 wherein said hydrophilic nylon 6 material is woven.

7. The product of claim 1 further comprising an adhesive layer between said film layer and said textile material layer.

8. The product of claim 1 further comprising a hydrophobic textile material layer adjacent said textile material layer, said textile material layer being hydrophilic and also adjacent said film layer.

9. The product of claim 8 wherein said textile material layer comprises a hydrophilic polyamide material, and said hydrophobic textile material layer comprises a polyester.

10. The product of claim 9 further comprising an adhesive layer between said film layer and said textile material layer.

* * * * *